Sept. 23, 1952         C. L. SCHEER         2,611,506
SEALING STRUCTURE OF THE GASKET TYPE
Filed June 28, 1949
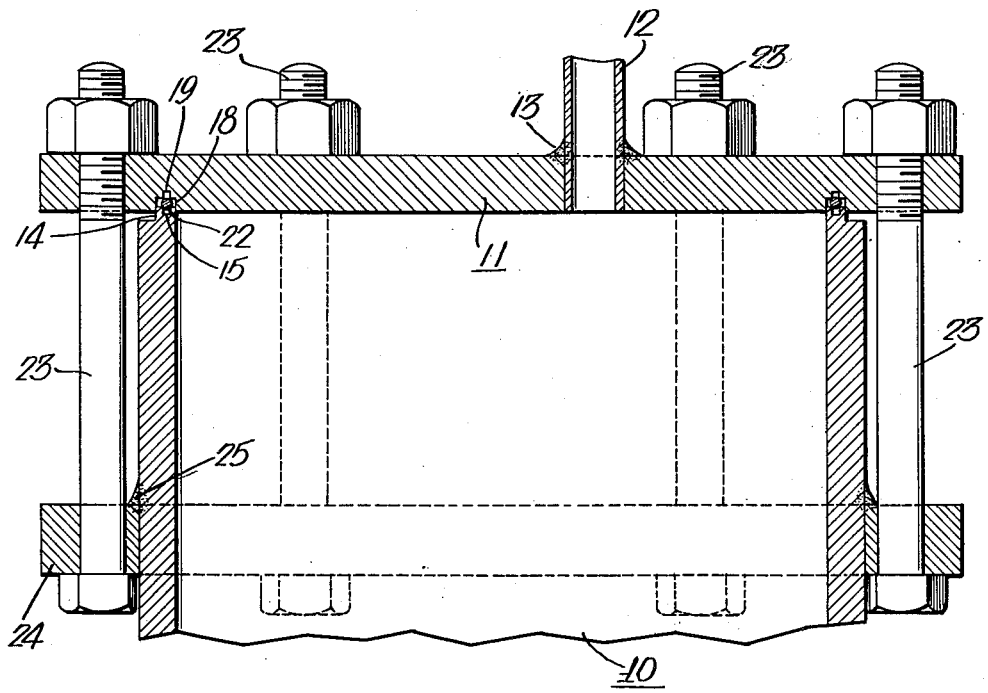
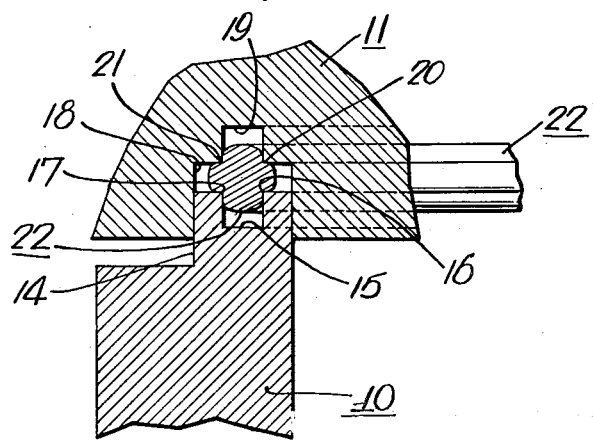
Inventor:
Charles L. Scheer
by his Attorneys
Howson & Howson Patented Sept. 23, 1952

2,611,506

UNITED STATES PATENT OFFICE 2,611,506

SEALING STRUCTURE OF THE GASKET TYPE

Charles L. Scheer, Haddonfield, N. J., assignor to Foote Mineral Company, Philadelphia, Pa., a corporation of Pennsylvania Application June 28, 1949, Serial No. 101,853

3 Claims. (Cl. 220—46)

This invention relates to gasket-type sealing structures for use in instances where it is desired to provide a gas-tight seal, particularly where high temperatures are involved. In its more limited aspect, the invention relates to sealing structures for closed chambers.

The function of a gasket is to create and maintain a tight seal between separable members of a mechanical assembly. In order to be 100% efficient, therefore, a very high degree of intimacy of contact must be established and maintained throughout the life of the seal so that leakage does not occur. In the low temperature field of demountable enclosures, soft materials are used, such as rubber, cork, asbestos, paper, etc. Since these materials readily move under compressive forces the mechanical problems are not unusually severe, and their decomposition, vapor pressure and resistance to corrosion become the principal factors to consider.

For extreme conditions of temperature and corrosion an all-metal gasket is required. The choice of gasket materials is therefore limited to those metals which will yield under an applied force and which will not unduly corrode when exposed to the conditions within the sealed chamber. The development and maintenance of the sealing forces therefore dictate the design of the mechanical assembly. The general theories of gasket compression as used with the softer sealants as mentioned above have been carried over and adapted to metal gaskets for industrial application. It is readily apparent, therefore, that very high order of forces are required to compress a metal member. As a solid metal ring, for example, is compressed between two flat parallel members its area increases and the work hardening property of the metal used further resists movement. The force necessary to obtain a seal therefore becomes logarithmic requiring a massive bolt and flange assembly which is costly and bulky. With such a set of conditions the maintenance of the seal is dependent on the tensile stress within the restraining bolt bodies. With high temperatures present the gasket metal often times is subject to creeping. When this occurs the initial applied force is lost and leakage usually results.

The principal object of the present invention is to provide a gasket-type sealing structure which will maintain a seal under high temperature conditions.

A further object of the invention is to provide such a sealing structure which utilizes applied forces of relatively low magnitude and yet is capable of maintaining a tight seal over a wide range of temperatures.

The structure provided by the present invention is particularly characterized in that a metal gasket is subjected to a biting or shearing action which establishes and maintains a very high degree of intimacy of contact.

The invention may be fully understood from the following detailed description with reference to the accompanying drawing, wherein Fig. 1 is a sectional view illustrating the application of the present invention to the sealing of a chamber; and Fig. 2 is a greatly enlarged sectional illustration showing the biting or shearing action which is obtained.

Referring first to Fig. 1, there is shown at 10 a portion of a cylindrical metallic vessel having an associated metallic closure member 11. The metal of which the vessel and closure member are formed may be any metal suitable for purpose to which the closed vessel is to be applied. It is desired to provide a tight seal between the vessel 10 and the closure member 11, and the illustrated form of the invention is directed to that end. Assuming that the vessel 10 is to be evacuated, the closure member 11 is provided with an exhaust tube 12 which may be seated in an aperture provided in said member and may be welded to said member as indicated at 13.

In accordance with the present invention, the upper portion of the cylindrical vessel 10 is provided with a projection 14 which, of course, is of annular form, and said projection is provided with an annular recess 15. As may be seen more clearly in Fig. 2, the annular recess 15 is of square formation and it forms a pair of concentric circular edges 16 and 17. The closure member 11 is provided with an annular recess 18 which is adapted to receive the annular projection 14 as may be clearly seen in Fig. 2. The closure member 11 is also provided with a narrower annular recess 19 which extends from the bottom of recess 18 and which is similar to recess 15 and directly opposed thereto. By this construction, there are provided concentric circular edges 20 and 21 which are in opposed relation respectively to the edges 16 and 17. A metallic annular gasket element 22 is disposed between the pairs of edges and is engaged thereby. This element is of circular cross section and its cross-sectional area is of greater diametrical dimension than the spacing of each pair of edges. Consequently, the opposed pairs of edges are adapted to shear into the gasket element when forces are applied to the members 10 and 11 as now to be described.

As may be seen in Fig. 1, the closure member 11 is attached to the vessel 10 by means of low-expansion bolts 23 which pass through apertures in the closure member 11 and through corresponding apertures in a ring flange 24 surrounding the vessel 10 and welded thereto as indicated at 25. Tightening of the bolts causes forces to be applied to the vessel 10 and the closure member 11, which forces are effective to produce biting or shearing action of the abovementioned pairs of edges upon the gasket element, as illustrated in Fig. 2. It is preferred to use Invar bolts and hardened steel nuts with an 85% thread to insure the mechanical stress in the bolt body and not in the threads which are apt to strip with the standard 75% thread. The use of bolts formed material having low thermal expansion, such as Invar, gives additional tightness due to the differential expansion of the vessel and the bolts. This insures a tighter assembly at elevated temperatures.

By means of the structure provided by the invention, it is possible to obtain a tight seal utilizing applied forces of relatively low magnitude. Such forces are of the order of one-third the magnitude of forces required where compression is relied upon to effect a seal. It should be noted further that the metal gasket is confined by the inter-fitting portions of members 10 and 11 in such a manner as to insure the shearing action throughout the entire circular length of the gasket. Moreover, the gasket is shielded from any corrosive vapors that may be present within the vessel 10, and therefore the gasket metal can be chosen for its thermal and physical properties and better design can thus be obtained.

In certain physical embodiments, a metal such as Hastelloy B or Inconel was used for the vessel 10, and a Monel metal was used for the closure member 11. The gasket ring was formed of electrical conductor grade aluminum wire with the ends thereof hydrogen welded together and fully annealed to form a continuous ring. The projection 14 and the recess 18 were approximately .125 inch wide, the projection being slightly narrower than the recess to permit the desired interfitting thereof. The recesses 15 and 19 were 3/64 inch square. The cross-sectional diameter of the gasket element was .114 inch.

It will be understood, of course, that the invention is not limited as to structural details nor as to materials and dimensions, as long as the essential features of the invention are maintained.

I claim:

1. In a gasket-type sealing structure, a first rigid member having an annular portion with an annular recess therein forming a pair of concentric circular edges, a second rigid member having an annular recess adapted to receive said annular portion, said second member also having a narrower annular recess forming within its first recess a pair of concentric circular edges in opposed relation respectively to the first-mentioned edges, an annular gasket element of circular cross-section disposed between the said pairs of edges and engaged thereby, the circular cross-sectional area of said element being of greater diametrical dimension than the spacing of the edges of each said pair of edges, and means for applying forces to said members effective to produce biting or shearing action of said pairs of edges upon said gasket element.

2. In a gasket-type chamber-sealing structure, a chamber-forming member having an annular wall projection with an annular recess therein forming a pair of concentric circular edges, a closure member having an annular recess adapted to receive said annular projection, said closure member also having a narrower annular recess forming within its first recess a pair of concentric circular edges in opposed relation respectively to the first-mentioned edges, an annular gasket element of circular cross-section disposed between the said pairs of edges and engaged thereby, the circular cross-sectional area of said element being of greater diametrical dimension than the spacing of the edges of each said pair of edges, and means for applying forces to said members effective to produce biting or shearing action of said pairs of edges upon said gasket element.

3. A gasket-type chamber-sealing structure according to claim 2, wherein said members and said gasket element are composed of metallic materials, and said force-applying means comprises a plurality of bolts composed of material having low thermal expansivity.

CHARLES L. SCHEER.

REFERENCES CITED

The following references are of record in the file of this patent:

UNITED STATES PATENTS

| Number | Name | Date |
|---|---|---|
| 84,014 | Stamm | Nov. 10, 1868 |
| 783,944 | Frost | Feb. 28, 1905 |
| 924,039 | Clark | June 8, 1909 |
| 1,363,320 | Horinchi | Dec. 28, 1920 |
| 1,821,866 | Wilson | Sept. 1, 1931 |
| 1,835,921 | Woodruff | Dec. 8, 1931 |
| 2,298,511 | Rathbun | Oct. 13, 1942 |
| 2,383,089 | Theiler | Aug. 21, 1945 |

FOREIGN PATENTS

| Number | Country | Date |
|---|---|---|
| 221,379 | Switzerland | Aug. 17, 1942 |